(12) United States Patent
Anderson et al.

(10) Patent No.: US 6,231,691 B1
(45) Date of Patent: May 15, 2001

(54) LEAD-FREE SOLDER

(75) Inventors: Iver E. Anderson; Robert L. Terpstra, both of Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 0 days.

(21) Appl. No.: 08/796,471

(22) Filed: Feb. 10, 1997

(51) Int. Cl.$^7$ ............................. C22C 7/00; C22C 13/00
(52) U.S. Cl. .................. 148/400; 420/560; 420/557; 420/590; 228/56.3
(58) Field of Search ..................... 420/557, 560, 420/590; 148/400; 228/56.3

(56) References Cited

U.S. PATENT DOCUMENTS

| | | |
|---|---|---|
| 989,573 | 4/1911 | Daudelin . |
| 1,437,641 | 12/1922 | Ferriere . |
| 4,248,905 | 2/1981 | Harvey ................... 427/11 |
| 4,643,875 | 2/1987 | Mizuhara ............... 420/502 |
| 4,670,217 | 6/1987 | Henson et al. ........ 420/562 |
| 4,695,428 | 9/1987 | Ballentine et al. ... 420/561 |
| 4,758,407 | 7/1988 | Ballentine et al. ... 420/560 |
| 4,778,733 | 10/1988 | Lubrano et al. ...... 428/647 |
| 4,879,096 | 11/1989 | Naton .................... 420/561 |
| 5,527,628 | 6/1996 | Anderson .............. 428/647 |
| 5,863,493 | 1/1999 | Achard et al. ........ 420/557 |

FOREIGN PATENT DOCUMENTS

| | | |
|---|---|---|
| 0847829 | 6/1998 | (EP) . |
| 42-18219 | 9/1967 | (JP) ................. 420/558 |
| 52-6468 | 1/1977 | (JP) . |
| 06269983 | 9/1994 | (JP) . |
| 6269983 * | 9/1994 | (JP) . |
| 08132279 | 5/1996 | (JP) . |
| 8132279 * | 5/1996 | (JP) . |

OTHER PUBLICATIONS

Uber den Aufbau des Systems Silber–Kupfer–Zinn; BD50 (1959) H. 10; Von Erich Gebhardt et al. and English translation thereof.

Jin, Sungko, Developing Lead–Free Solders: A Challenge and Opportunity; JOM, Jul., 1993, p. 13.

* cited by examiner

Primary Examiner—Sikyin Ip

(57) ABSTRACT

A Sn—Ag—Cu eutectic alloy is modified with one or more low level and low cost alloy additions to enhance high temperature microstructural stability and thermal-mechanical fatigue strength without decreasing solderability. Purposeful fourth or fifth element additions in the collective amount not exceeding about 1 weight % (wt. %) are added to Sn—Ag—Cu eutectic solder alloy based on the ternary eutectic Sn—4.7%Ag—1.7%Cu (wt. %) and are selected from the group consisting essentially of Ni, Fe, and like-acting elements as modifiers of the intermetallic interface between the solder and substrate to improve high temperature solder joint microstructural stability and solder joint thermal-mechanical fatigue strength.

12 Claims, 5 Drawing Sheets

Aged Microstructure

Sn-4.7 Ag-1.7Cu
(Control)

DTA $T_a$ = 216.8 °C

Wetting Angle Mean = 35.25°
Wetting angle Range = 34-37°

Unaged Microstructure

Aged Microstructure 99.85(Sn-4.7 Ag-1.7Cu) + 0.15Ni

DTA $T_s$ ≈ Similar to Sn-4.7 Ag-1.7Cu  Wetting Angle Mean ≈ 30.0°
DTA $T_l$ ≈ Similar to Sn-4.7 Ag-1.7Cu  Wetting Angle Range = 28-34°

Unaged Microstructure

Aged Microstructure 99.7(Sn-4.7 Ag-1.7Cu) + 0.3Fe

DTA $T_s$ ≈ Similar to Sn-4.7 Ag-1.7Cu    Wetting Angle Mean ≈ 36.5°
DTA $T_l$ ≈ Similar to Sn-4.7 Ag-1.7Cu    Wetting Angle Range = 27-45°

Unaged Microstructure

Aged Microstructure 99.7(Sn-4.7 Ag-1.7Cu) + 0.3Ni

DTA $T_s \approx 216.8\,°C$     Wetting Angle Mean $\approx 23.75°$
DTA $T_l \approx 219.0\,°C$     Wetting Angle Range = 17-27°

Unaged Microstructure

Aged Microstructure 99.7(Sn-3.6Ag-1.0Cu) + 0.3Ni

DTA $T_s$ = 217.2 °C
DTA $T_l$ = 219.2 °C

Wetting Angle Mean ≈ 30.0°
Wetting Angle Range = 29-32°

Unaged Microstructure

Aged Microstructure

LEAD-FREE SOLDER

CONTRACTUAL ORIGIN OF THE INVENTION

The United States Government has rights in this invention pursuant to Contract No. W-7405-ENG-82 between the U.S. Department of Energy and Iowa State University, Ames, Iowa, which contract grants to Iowa State University Research Foundation, Inc. the right to apply for this patent.

FIELD OF THE INVENTION

The present invention relates to lead-free solders, solder joints and soldering methods.

BACKGROUND OF THE INVENTION

The global drive to replace the use of toxic lead metal and its alloys in industrial applications has focused, in part, on the development of new Pb-free solder alloys. In addition to the toxicity of lead, there are other problems concerning continued widespread use of inexpensive Sn—Pb and Pb-based solders. Current leaded solders lack shear strength and resistance to creep and to thermal-mechanical fatigue. A solder which exhibits enhancements of these properties and retains solderability is crucial in automotive and other heavy industry applications where the solder joints are subjected to many thermal cycles, severe vibrations, and sustained temperatures of up to 150 to 170 degrees C. The consequence of solder joint failure in critical applications where "lifetime" performance is now expected can be disastrous.

The excellent metallurgical wetting, or "solderability," of Sn—37%Pb (weight %) is thought to be promoted by the instantaneous formation of a thin layer of a very stable intermetallic compound at the molten solder/base metal interface. Interestingly, the interfacial intermetallic compound that aids solder wetting is always based on Sn (not Pb), e.g., $Cu_6Sn_5$ forms at the interface between molten Sn—37%Pb solder and a Cu wire. The role of Pb in promoting solderability is much less understood, but seems related to its ability to strongly suppress the liquid surface tension of the solder alloy, lowering the contact angle of the molten solder which leads to better spreading and more interacting surface area for the solder joint to form. The eutectic solidification reaction of Sn—37%Pb also generates a highly refined mixture of Sn and Pb phases that produces unusual strength from rather weak constituents, i.e., Sn and, especially, Pb, along with good ductility for forming into wire and foil preforms. Thus, an effective alloy design strategy to develop a Pb-free solder is to start with Sn as the base of the alloy for metallurgical wetting, to add a second or third component to drive wetting and to depress the Sn alloy melting temperature, and to search for a composition that gives a highly-refined, eutectic-like solidification microstructure for an optimum balance of strength and ductility.

One additional design criteria for a Pb-free solder alloy intended for use in severe applications is to significantly improve on the ability of Sn—37%Pb to resist microstructural coarsening, thereby, retain strength and resisting metal fatigue even in high temperature, thermally cycled environments. A Sn—37%Pb solder joint solidification microstructure may start as a finely-spaced eutectic of Sn and Pb solid solution phases but can rapidly coarsen resulting in a lack of shear strength and resistance to creep and to thermal-mechanical fatigue. A new Pb-free solder should utilize microstructural design techniques that inhibit diffusion such as promoting intermetallic second phases formation to strengthen the Sn matrix instead of solid solution hardening or solidification of a finely dispersed primary phase like Bi. Another aspect of microstructural stability that should be addressed is the suppression of growth of the Cu—Sn intermetallic phase layers that initially perform a beneficial function for wetting. Unfortunately, after too much intermetallic growth, the interface between the solder and a Cu substrate can become a weak path for fatique crack growth. The real need is to develop new Pb-free solders that have similar processing characteristics and usage cost to Sn—Pb and Pb-based solders, but with improved mechanical properties and microstructural stability.

An important industrial consideration is the extensive investment in soldering equipment and manufacturing process design that is linked to existing leaded solders. This consideration favors the strategy of developing as close to a "drop in" Pb-free solder substitute as possible. In the electrical wiring and electronic packaging industries, a substitute is needed for Sn—37%Pb (wt. %) eutectic solder which melts at 183 degrees C. and is commonly used for a broad spectrum of electrically conductive joints. The melting point or liquidus temperature of a new Pb-free solder should be well below the range of adjustment, typically about 280 degees C. maximum, of commercial solder reflow ovens, wave and bath soldering units, and hand soldering guns intended for Sn—Pb solder to allow for a practical amount of superheat, typically 25 to 30 degrees C., during soldering.

One of the primary reasons for the popularity of Sn—37%Pb is its characteristic of excellent wettability and molten fluidity, or "solderability" when forming a solder joint on common metals, like Cu, steel, brass, and stainless steel. A eutectic solder alloy like Sn—37%Pb exhibits maximum fluidity as soon as melting begins because it has no "mushy" melting range. Effective soldering with Sn—37%Pb usually requires only a mild flux to remove surface oxides and to start the metallurgical solder wetting and bond formation in an ambient air environment. A large effort in the electronics industry to eliminate the use of CFC-based cleaning agents has lead to the universal push to ever milder fluxes that do not require post-reflow cleaning. Thus, any new Pb-free solder must be compatible with very mild fluxes. Also, any new Pb-free solder should not be sensitive to air oxidation.

The soldering needs of the heat exchanger industry, supplying automotive and industrial vehicle radiators, as well as industrial and residential climate control systems, and many other heavy industrial applications, such as hydraulic and pneumatic hose fittings connections, are perhaps broader and consume larger quantities of elemental Pb. This higher Pb consumption is because of the much broader use of Pb-based solders compared to Sn—37%Pb solder, especially, Pb—5%Sn solder, which melts gradually between 305 degrees C. and 316 degrees C. The Pb—5%Sn solder is commonly used for initial bath dip soldering of copper radiator cores and for some header and tank seams involving brass and steel. Sn—37%Pb is used only for secondary seams and finishing. The important solder properties in these applications are general mechanical durability, chemical stability, and thermal conductivity. The poor corrosion resistance and fatigue strength of Pb—5%Sn solder, particularly during pressurization cycles at temperatures of about 120 degrees C., are the primary property deficiencies that must be overcome by a Pb-free solder replacement. Solder alloy ingot and wire cost is a much more important criteria for heat exchanger manufacturing than for electronics, and any replacement for ultra-low cost Pb—5%Sn solder must be applied more efficiently, probably as a paste or preform foil, to compete on total manufacturing cost, even if significantly improved properties can be demonstrated.

A Pb-free ternary eutectic solder alloy, Sn—4.7%Ag—1.7%Cu (weight %) is described in U.S. Pat. No. 5,527,628, issued Jun. 18, 1996, which exhibits a melting point of 217 degrees C. and very good solderability. This solder alloy liquid solidifies as a fine eutectic microstructure of $Cu_6Sn_5$ and $Ag_3Sn$ intermetallic phases dispersed in a Sn(bct) matrix when cooled under typical solder reflow conditions, a microstructure which is significantly stronger than that of Sn—Pb eutectic solder. A Sn—Ag—Cu ternary eutectic had not been reported in previous experimental or calculated phase diagram studies and initial test results show great promise for this alloy as a Pb-free solder. The only significant deficiency of the Sn—Ag—Cu eutectic solder appeared to be a susceptibility to intermetallic layer growth at the solder/Cu substrate interface, particularly at high aging temperatures, a feature that is shared by essentially all high-Sn, Pb-free solders.

SUMMARY OF THE INVENTION

The present invention relates to a modification of the aforementioned Sn—Ag—Cu ternary eutectic Pb-free solder alloy and variants thereof with one or more low level and low cost alloy additions to enhance high temperature microstructural stability and thermal-mechanical fatigue strength without decreasing solderability. In one embodiment, fourth or fifth element additions in the collective amount of about 1 weight % or less are made to Sn—Ag—Cu solder alloys based on the ternary eutectic Sn—4.7%Ag—1.7%Cu (weight %) as well as variants thereof and are selected from the group consisting essentially of Ni, Fe, and like-acting elements. The additive element(s) act as a beneficial modifier(s) of the solder/substrate interface. Particularly, the addition of one or more additive elements benefically modifies the mophology and suppresses growth rate of an intermetallic interface layer under high temperature aging conditions to enhance high temperature microstructural stability and thermal-mechanical fatigue strength without decreasing solderability.

The present invention also envisions the possible reduction of the Ag content of the base ternary eutectic alloy, Sn—4.7%Ag—1.7%Cu (wt. %) and variants thereof, to lower the alloy cost without significant penalties in microstructural stability, increased pasty range (retaining a pasty range of less than 15 degrees C.), high temperature performance, and solderability. A modified range for silver content of these alloys extends from about 4.7 wt. % to about 3.0 wt. %. To produce a suitable solder microstructure, the Cu content can be lowered along with the Ag content to a minimum of about 0.5 wt % to account for the additive additions without promoting formation of large intermetallic phases in the body of the as-solidified solder. In other words the solder microstructure will retain the fine, uniform microstructure commonly associated with eutectic alloys. To accomplish this the ratio of Ag to Cu+X (where X=Ni, Fe, and like-acting elements) should remain similar to the Ag/Cu ratio in the Sn—Ag—Cu eutectic.

DESCRIPTION OF THE DRAWINGS

FIG. 1a is a photomicrograph at 500X of an unaged solder joint sample made using a control ternary eutectic Sn—4.7%Ag—1.7%Cu solder alloy, while

FIG. 2a is a photomicrograph at 500X of an unaged solder joint sample made using a 0.15 weight % Ni modified eutectic solder alloy pursuant to the invention, while

FIG. 3a is a photomicrograph at 500× of an unaged solder joint sample made using a 0.3 weight % Fe modified eutectic solder alloy pursuant to the invention, while

FIG. 4a is a photomicrograph at 500× of an unaged solder joint sample made using a 0.3 weight % Ni modified eutectic solder alloy pursuant to the invention, while

FIG. 5a is a photomicrograph at 500× of an unaged solder joint sample made using a 0.3 weight % Ni modified eutectic solder alloy having an off-eutectic base composition pursuant to the invention, while

DETAILED DESCRIPTION OF THE INVENTION

Figure 1A:
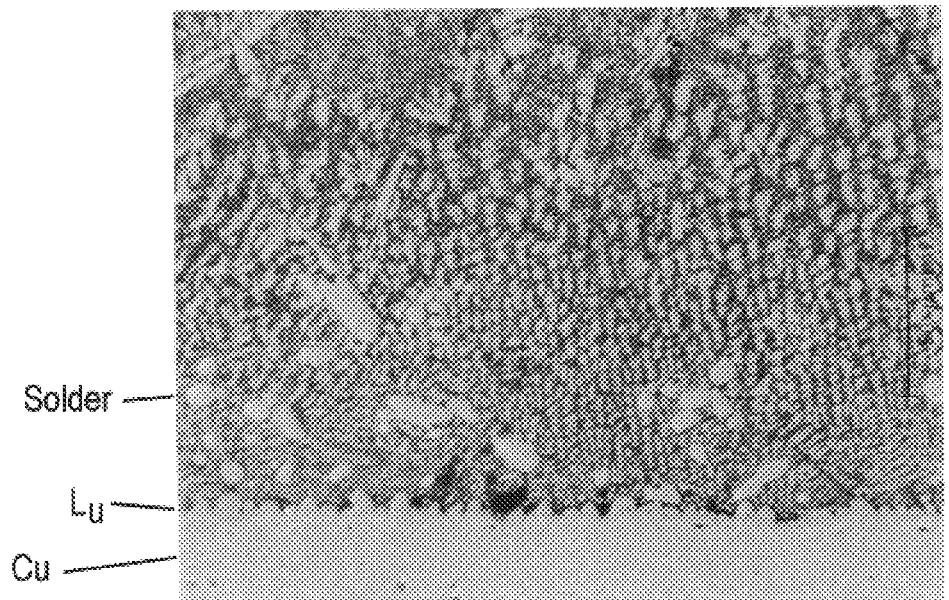

The aforementioned modified solder alloys of the present invention establish a new family of robust Pb-free solders that can operate or be exposed at temperatures up to about 170 degrees C. for example in service and which can substitute widely for Sn—Pb eutectic and Pb-based solders in manufacturing and repair operations. The solder is free of lead and the products of lead mining and refining. The solder components are of low cost, with the exception of Ag, and are all widely available with ample ore reserves.

The modified Sn—Ag—Cu ternary eutectic alloy and variants thereof pursuant to the present invention include one or more low level and low cost alloy additions to enhance high temperature microstructural stability and thermal-mechanical fatigue strength without decreasing solderability. In particular, purposeful or intentional fourth, fifth or more element additions in a collective amount of about 1 weight % (wt. %) or less of the solder alloy composition are made to the ternary eutectic Sn—Ag—Cu solder alloy based on the ternary eutectic Sn—4.7%Ag—1.7%Cu (weight %) as well as variants thereof. The additive elements are selected from the group consisting of Ni, Fe, and like-acting elements that benficially modify the morphology and/or suppress growth of the intermetallic interface, especially from high temperature aging, in a manner to improve high temperature microstructural stability and thermal-mechanical fatigue strength without decreasing solderability. In addition to nickel and iron, other like-acting additive elements to this end include cobalt which is less preferred as a result of its relatively high cost and uncertain availability. Each additive element may be present alone in an amount of at least about 0.01 weight % and preferably not exceeding about 0.5 weight % of the solder alloy composition. The addition of one or more of the additive elements modifies the mophology of the as-solidified intermetallic interface typically containing a thin layer of $Cu_6Sn_5$, with the soldered substrate or component typically being Cu, in particular to reduce the thickness of the as-solidified intermetallic interface. More importantly, the addition of one or more of the additive elements modifies the mophology and suppresses the growth rate of high temperature aged intermetallic interface, typically containing Cu based layers of $Cu_6Sn_5$ and $Cu_3Sn$, with the substrate or component typically being Cu. The morphology modification appears to be accomplished by a mechanism which acts to destroy the preferential growth facets or surfaces of the intermetallic interface to instead permit more unfaceted, non-planar interface growth surfaces, although Applicants do not wish or intend to be bound by any theory in this regard. The growth suppression appears to be accomplished by a mechanism which acts to limit diffusive transport of Cu from the substrate or component to the growing intermetallic layers because of additional strains imposed on the inter-metallic phases by the substitutional additions, although Applicants do not wish or intend to be bound by any theory in this regard. Also, the limited diffusive transport of Cu from the substrate or component into the body of the solder achieved through the addition of one or more additive elements serves to limit the formation and excessive growth of near-interface intermetallic phases, primarily $Cu_6Sn_5$, in the solder microstructure.

The modified solder alloy of the present invention exhibits a melting temperature of about 217 degees C. with a liquid-solid temperature "pasty" range relative to the melting temperature not exceeding 15 degree C., preferably not exceeding about 5 degrees C. above the melting temperature. For electronic solder applications using solder reflow procedures, the melting temperature range (liquid plus solid phases) of the solder of the invention is extended no more than 15 degrees C. above the ternary eutectic melting temperature. In particular, such solder reflow procedures involve general heating of a wiring board to temperature s of about 230 to 250 degrees C. Solders used in the such solder relfow procedure desirably exhibit a limited melting range (i.e. liquid-solid "mushy" zone) less than about 15 degrees C.

A particular modified Sn—Ag—Cu—X solder alloy of the present invention consists essentially of, in weight %, about 3.5 to about 7.7 weight % Ag, about 1.0 to about 4.0 weight % Cu, intentional addition of one or more of Ni, Fe and like-acting additive elements in a collective amount of about 1 weight % (wt. %) or less, and balance essentially Sn. A particular modified Sn—Ag—Cu—X solder alloy of the present invention lean in silver consists essentially of, in weight %, about 4.0 to about 3.0 weight % Ag, about 4.0 weight to about 0.5 weight % Cu, intentional addition of one or more of Ni, Fe and like-acting additive elements in a collective amount of about 1 weight % (wt. %) or less, and balance Sn where Sn is preferably present in an amount of at least about 89 weight % Sn of the solder alloy. The ratio of Ag to Cu+X (where X=Ni, Fe, and like-acting elements) in the modified solder alloys of the present invention should remain similar to the Ag/Cu ratio in the Sn—Ag—Cu eutectic; i.e., about Ag/(Cu+X)=3/1.

The modified Sn—Ag—Cu—X solder alloy of the present invention can be made in the manner decribed in U.S. Pat. No. 5,527,628, the teachings of which are incorporated herein by reference. The solder alloy can be made and used in various forms such as solder wire, sheet, foil, ingot, powder and others. Solder powder of the invention can be incorporated into electronic solder paste for use in circuit asembly by means of surface mount technology. Solder flux formulations for all forms of the solder of the invention can be selected from commercially available flux products or as developed for particular applications.

The melting behavior of the modified solder alloys of the present invention is that of a near-eutectic alloy with a pasty range (liquid plus solid temperature range) typically less than 5 degrees C. and certainly less than 15 degrees C. The start of solder alloy melting will occur at about 217 degrees C., which is the eutectic melting temperature of the base Sn—4%Ag—1.7%Cu (weight %) eutectic alloy. These melting temperatures can be tolerated by many existing components and circuit boards and should be compatible with conventional reflow ovens, soldering irons, and other solder melting devices.

The as-solidified solder microstructure is essentially a fine eutectic mixture of intermetallic phases, $Cu_6Sn_5$ and $Ag_3Sn$, dispersed in a Sn matrix upon solidification at conventional cooling rates (1 to 10 degrees C./second) for soldering operations. The additions of additive element(s) described above may dissolve into the Cu-based intermetallic phases present in the solder microstructure according to analysis of the metallic radii of the additiives; i.e. Ni and Fe, where the radii do not differ by more than about 3% from the Cu atom (see Table I.), althugh Applicants do not wish or intend to be bound by any theory in this regard. This is well within the alloy design criteria of about 10% deviation for expected significant (5 atomic %) solid solubility reported by Hume-Rothery.

TABLE I

| Element | Metallic Radius (angstroms) | Radius Mismatch |
| --- | --- | --- |
| Cu | 1.278 | 0 (base) |
| Fe | 1.274 | −0.3% |
| Ni | 1.246 | −2.6% |

The additive elements within the solder body and at the substrate (e.g., Cu)/solder interface serve to beneficially modify the morphology and suppress the growth rate of the Cu based intermetallics during high temperature aging. The morphology modification is especially important at the solder/Cu solder interface where the interface morphology of the invention after aging adopts a more unfaceted non-planar more even growth surface. Such an interface will resist both tensile and shear stresses far better than the regularly faceted interfaces common for most Sn-based solders. Thus, when loaded in either constant stress, i.e., creep conditions, or in cyclic stress, i.e., fatigue conditions, the solder microstructure of this invention will display significantly improved creep and fatigue resistance.

The elevated temperature aged intermetallic interface of the solders of the invention will advance at a reduced rate which minimizes interface layer thickness and reduces the extent of the solute depleted zone adjacent to the interface in the body of the solder microstructure. A solute depleted zone will consist essentially of pure Sn which has a significantly reduced strength. Both of these features, a thinner intermetallic interface for a given aging exposure and a reduced solute depleted zone, will also improve the resistance of such solder joints to creep and fatigue failures.

The minimization of Cu diffusion through the intermetallic interface that appears to be promoted by the solder alloy of this invention also results in a significant reduction of near-interface large intermetallic precipitate phases in the solder microstructure. The presence of these large, sharp-edged intermetallic particles, typically $Cu_6Sn_5$, in most Sn-based solders after aging can encourage fatigue crack nucleation. The significant reduction or in some cases lack of such precipitates will further promote extended fatigue resistance in the solder alloys of this invention.

No viable alternatives to this invention are known to perform at the same temperatures with equivalent properties and be composed of similarity suitable components with such ease of processing.

The following Examples are offered to better illustrate the present invention without in any way limiting the scope thereof.

EXAMPLES

Alloys (in wt. %) of the following compositions:

99.7%(Sn—4.7%Ag—1.7%Cu)+0.3% Ni
99.85%(Sn—4.7%Ag—1.7%Cu)+0.15% Ni
99.7%(Sn—4.7%Ag—1.7%Cu)+0.3% Fe
99.7%(Sn—3.6%Ag—1.0%Cu)+0.3% Ni were made and subjected to the following tests:

Differential thermal analysis (DTA) was conducted to determine melting behavior (solidus temperature and liquidus temperature) of the solder.

Solder joint samples (drops) were melted and solidified on Cu substrate (i.e. soldered component) using RMA (rosin mildly active) flux (Alpha 611 flux from Alpha Metals, Jersey City, N.J.) and quenched in silicone vacuum pump oil (Dow 200) to get a uniform as-solidified microstructure because of the constant cooling rate of 5 to 10 degrees C./second which is typical of industrial soldering operations (paste reflow and hand soldering with a soldering iron).

As-solidified microstructure of each sample was examined to verify resemblence to the eutectic microstructure and substrate/solder interface morphology described above.

Solder joint samples annealed (aged) in air atmosphere furnace at 170 degrees C. for about 2 days to simulate severe temperature exposure, for example, experienced by exposure of the solder joint in service to 170 degrees C. for extended times. A control sample of the aforementioned unmodified Sn—Ag—Cu eutectic alloy of U.S. Pat. No. 5,527,628 was included for direct comparison.

Aged microstructure of each sample was examined to verify modification of interface aging characteristics and near-interface solder microstructure features.

Figure 1B:
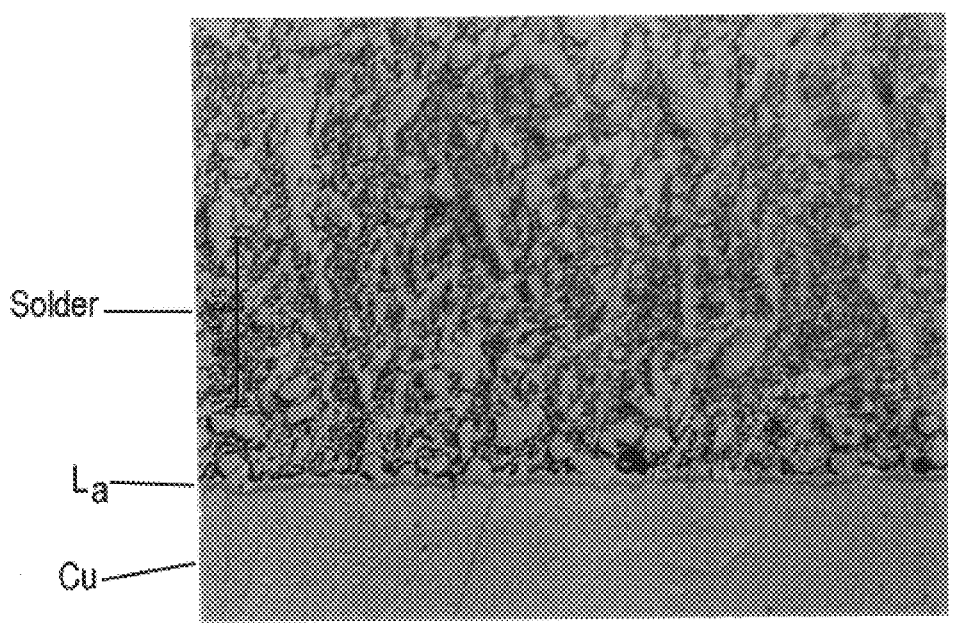
FIG. 1b is a similar photomicrograph of the solder joint aged as described below.

FIG. 1a is a photomicrograph of an unaged solder joint sample made using the aforementioned control ternary eutectic Sn—4.7%Ag—1.7%Cu solder alloy (weight %), while FIG. 1b is a similar photomicrograph of the solder joint of FIG. 1a aged as described above. This solder sample provides a comparison for the solder joint samples made pursuant to the present invention and discussed below.

Figure 2A:
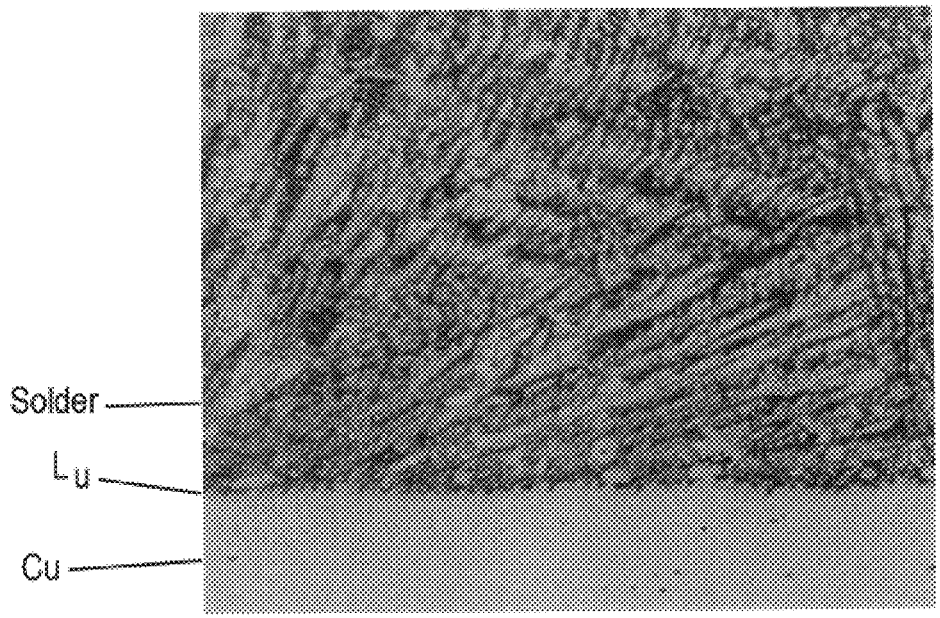
Figure 2B:
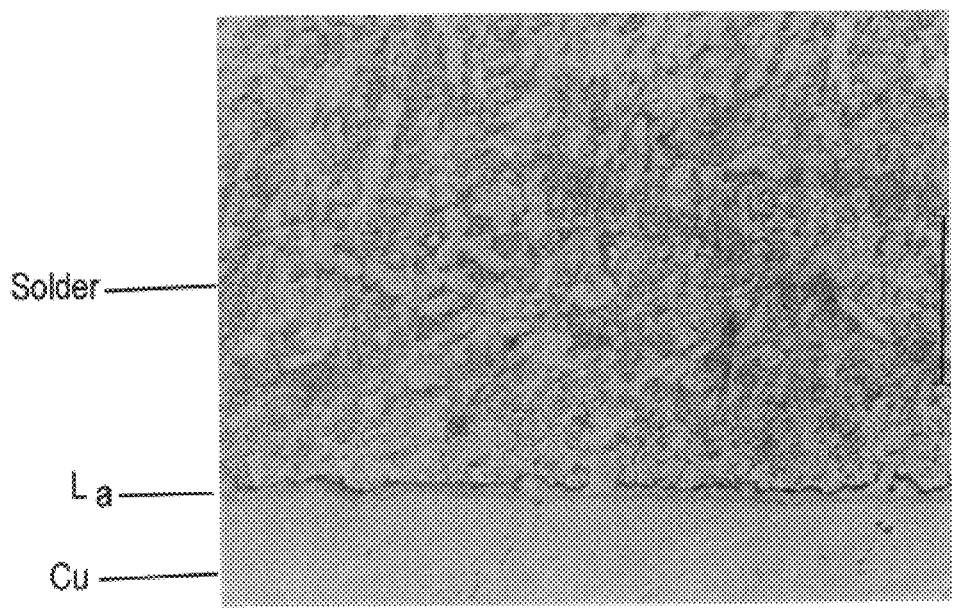
FIG. 2b is a similar photomicrograph of the solder joint aged as described below.

FIG. 2a is a photomicrograph of an unaged solder joint sample made using a 0.15 weight % Ni modified eutectic solder alloy pursuant to the invention, while FIG. 2b is a similar photomicrograph of the solder joint sample aged as described above.

Figure 3A:
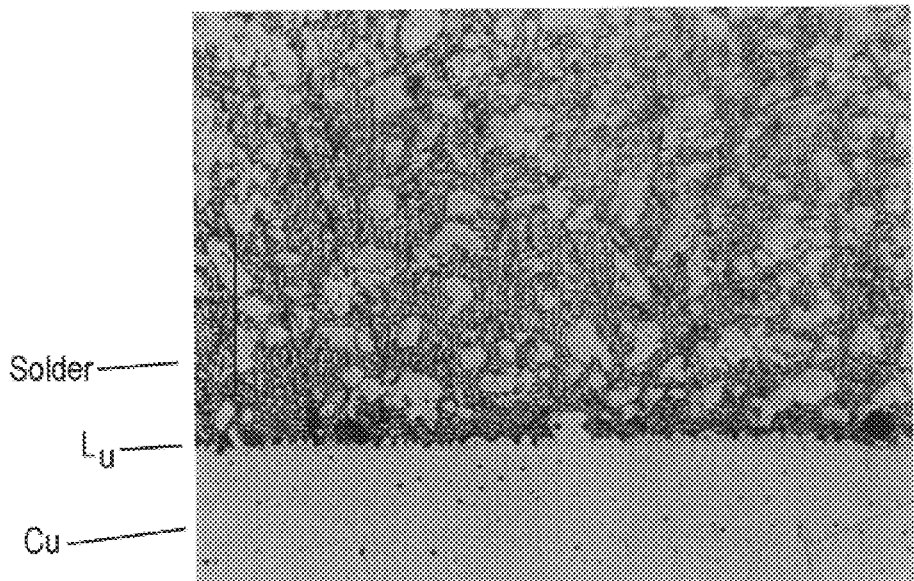
Figure 3B:
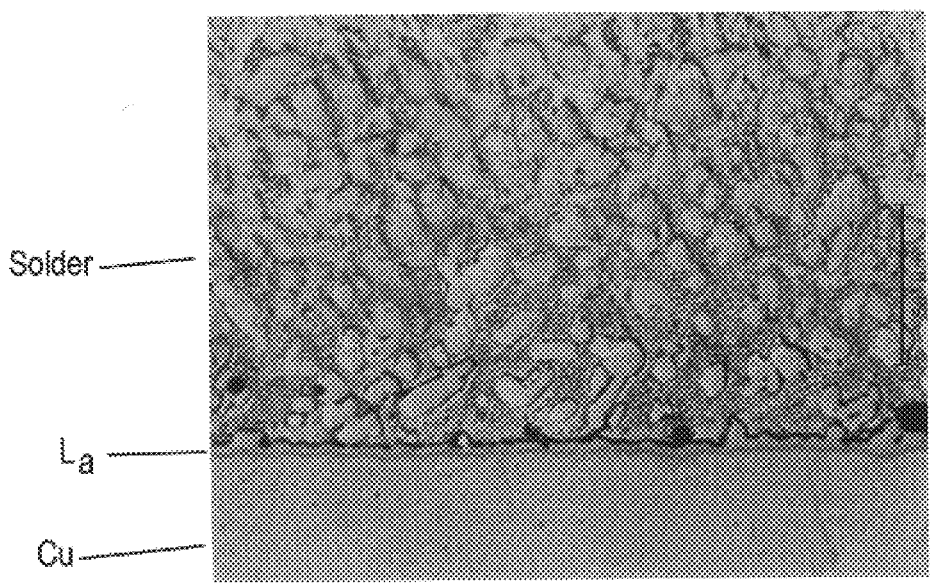
FIG. 3b is a similar photomicrograph of the solder joint aged as described below.

FIGS. 3a (unaged solder joint) and 3b (aged solder joint) are similar photomicrographs for a 0.3 weight % Fe modified eutectic solder alloy joint pursuant to the invention.

Figure 4A:
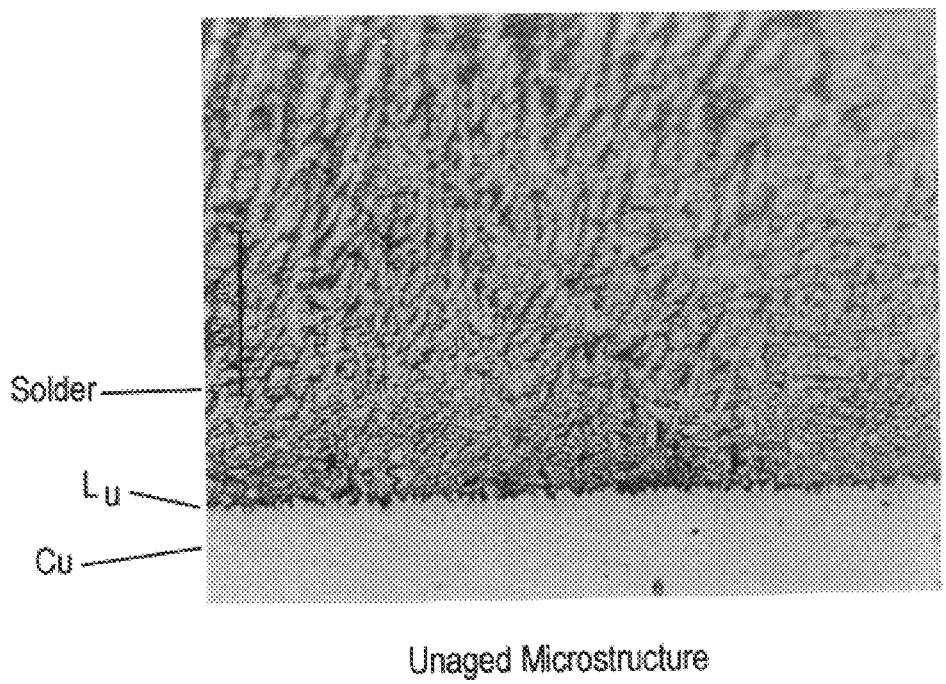
Figure 4B:
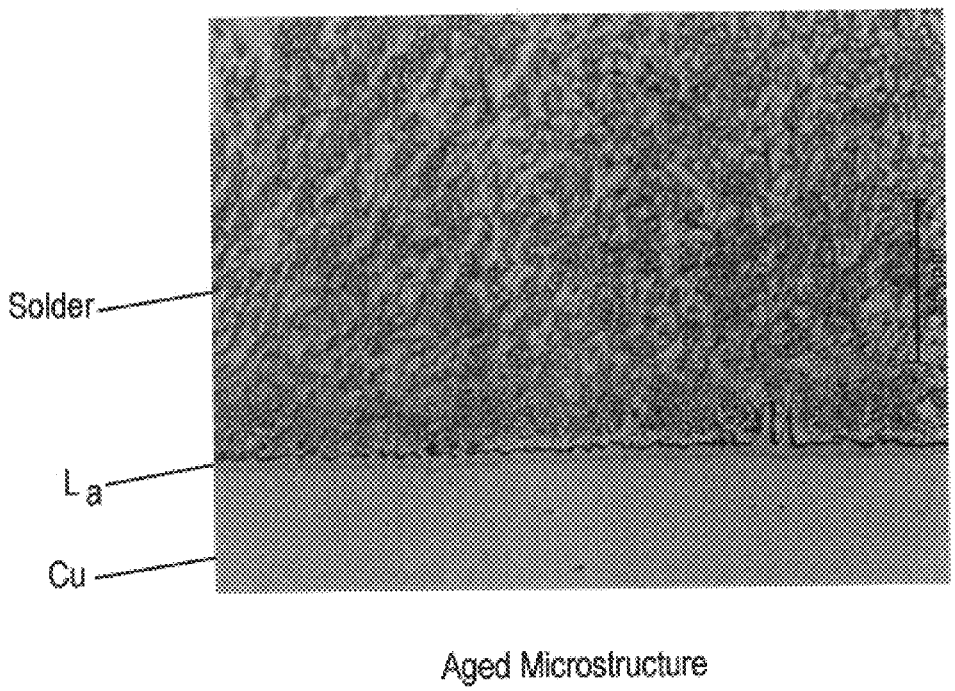
FIG. 4b is a similar photomicrograph of the solder joint aged as described below.

FIG. 4a (unaged solder joint) and 4b (aged solder joint) are similar photomicrographs for a 0.3 weight % Ni modified eutectic solder alloy joint sample pursuant to the invention.

Figure 5A:
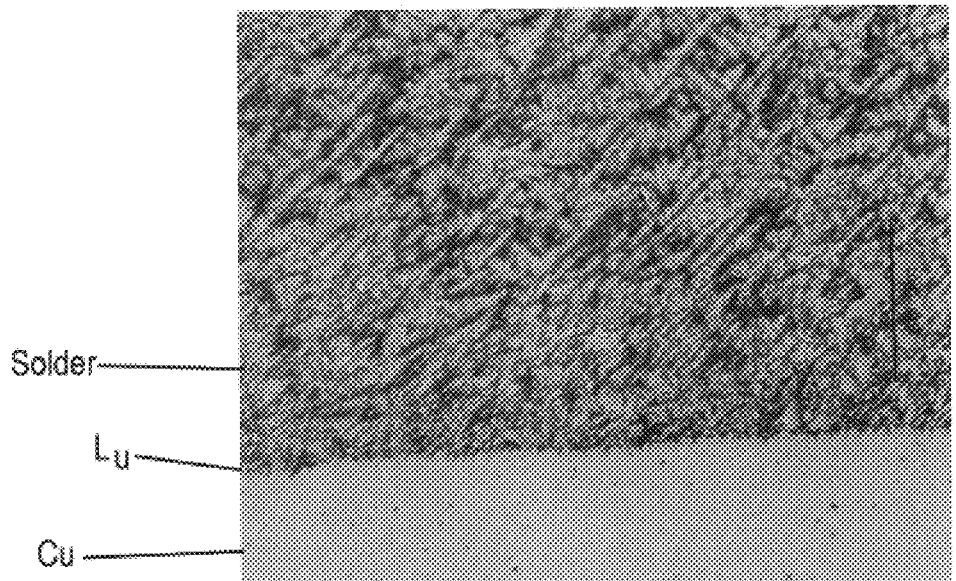
Figure 5B:
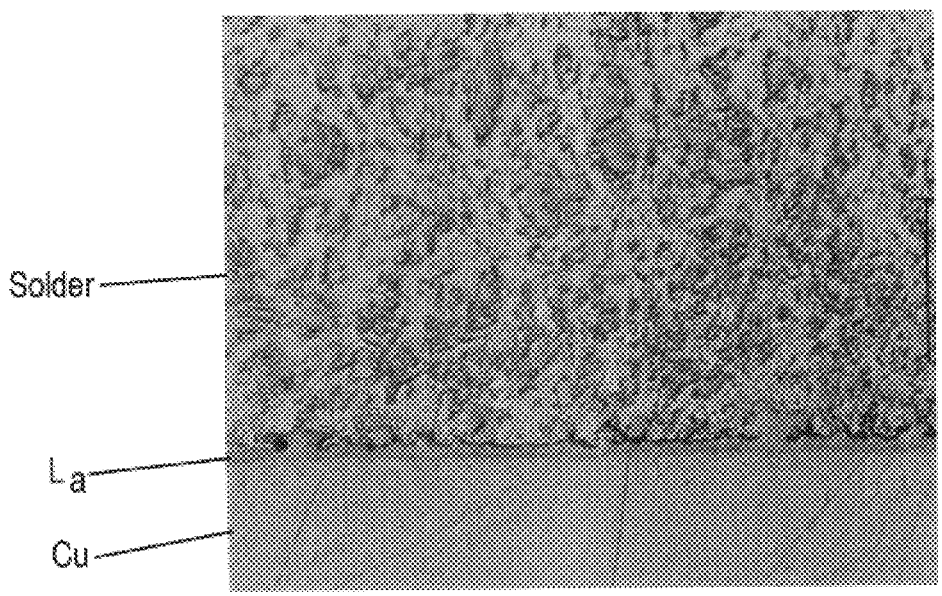
FIG. 5b is a similar photomicrograph of the solder joint aged as described below.

FIG. 5a (unaged solder joint) and 5b (aged solder joint) are similar photomicrographs for a 0.3 weight % Ni modified eutectic solder alloy joint sample having an off-eutectic (Sn—3.6%Ag—1.0% Cu) base composition pursuant to the invention.

The joint samples of FIGS. 2–5 had solder compositions that corresponded to those set forth above under EXAMPLES.

In FIGS. 1–5, the thickest as-solidified (unaged) Cu based intermetallic interface layer $L_u$ was observed in the microstructures of the control solder joint sample. Similarly, the thickest aged intermetallic interface layer $L_a$ was observed in the microstructures of the aged control solder joint sample. In FIGS. 1–5, unaged interface layer $L_u$ was likely $Cu_6Sn_5$, while aged interface layers $L_a$ were likely $Cu_6Sn_5$ (light gray phase layer with layer regions extending into the solder body in FIGS. 1b–5b) and $Cu_3Sn$ (darker gray phase layer adjacent Cu substrate in FIGS. 1b–5b). In FIGS. 1–5, the black line(s) or segments adjacent the intermetallic interface layer is/are polishing and etching artifacts.

In all solder joint samples examined, the unaged joint microstructures exhibited a thinner intermetallic interface layer $L_u$ as compared to the aged interface layers $L_a$ present in the aged solder joint microstructures.

Comparing FIGS. 2b–5b to FIG. 1b, it is apparent that the aged intermetallic interface layers ($Cu_6Sn_5$ and $Cu_3Sn$) of the solder joint samples made pursuant to the invention exhibited significantly reduced faceted, planar angular growth surfaces or regions extending into the solder body, which reduction will enhance high temperature solder joint microstructural stability and thermal-mechanical fatigue solder joint strength. In the solder joint samples of the invention of FIGS. 2b–5b, the interface layer adopted a more unfaceted, more even growth interface surface or morphology. Moreover, these beneficial interface features were achieved without substantially decreasing solderability as evaluated by measured DTA liquidus and solidus temperatures ($T_l$ and $T_s$ both in degrees C.) and wetting angle mean and range (degees). For example, in FIGS. 2–5, the DTA liquidus and solidus temperatures measured as well as the wetting angle mean and wetting angle range are set forth for comparison to similar data measured for the control sample joint. For the control sample of FIG. 1, the $T_s$ was approximately 216.8 degrees C. and the wetting angle mean was approximately 35.25 degrees and wetting angle range was approximately 34–37 degrees. For the 0.15% Ni modified solder alloy of FIG. 2, the $T_s$ and $T_l$ were approximately similar to those of the control ternary eutectic sample and the wetting angle mean was approximately 30.0 degrees and wetting angle range was approximately 28–34 degrees. For the 0.3% Fe modified solder alloy of FIG. 3, the $T_s$ and $T_l$ were approximately similar to those of the control ternary eutectic sample and the wetting angle mean was approximately 36.5 degrees and wetting angle range was approximately 27–45 degrees. For the 0.3% Ni modified solder alloy of FIG. 4, the $T_s$ and $T_l$ were approximately similar to those of the control ternary eutectic sample and the wetting angle mean was approximately 23.75 degrees and wetting angle range was approximately 17–27 degrees. For the 0.3% Ni modified solder alloy of FIG. 5, the $T_s$ and $T_l$ were approximately similar to those of the control ternary eutectic sample and the wetting angle mean was approximately 30.0 degrees and wetting angle range was approximately 29–32 degrees.

While the present invention has been described in terms of specific embodiments thereof, it is not intended to be limited thereto but rather only to the extent set forth hereafter in the following claims.

We claim:

1. A Pb-free solder consisting essentially of a eutectic composition consisting essentially of, in weight %, 93.6 weight % Sn, about 4.7 weight % Ag, about 1.7 weight % Cu having a eutectic temperature of about 217 degrees C. and including variant compositions from said eutectic composition wherein the concentrations of Sn, Ag, and Cu vary from said eutectic composition with said Ag not exceeding about 4.7 weight % and said Cu not exceeding about 1.7 weight % in said variant compositions to provide a Sn concentration of at least 93.6 weight % to provide a controlled melting temperature range not exceeding about 15 degrees C. above said eutectic melting temperature, and comprising an additive element selected from the group consisting of Fe and Co present in said solder in an amount effective to form a thermal growth resistant intermetallic interface between the solder and a substrate as compared to an interface formed between the same solder, devoid of said additive element, and said substrate.

2. The solder of claim 1 wherein the ratio of Ag/(Cu+X) where X= at least one of Fe and Co is about 3 to 1.

3. A solder joint comprising an alloy having a eutectic composition consisting essentially of, in weight %, 93.6 weight % Sn, about 4.7 weight % Ag, about 1.7 weight % Cu having a eutectic melting temperature of about 217 degrees C. and including variant compositions from said eutectic composition wherein the concentrations of Sn, Ag, and Cu vary from said eutectic composition with Ag not exceeding about 4.7 weight % and Cu not exceeding about 1.7 weight % in said variant compositions to provide a Sn concentration of at least 93.6 weight % to provide a controlled melting temperature range not exceeding about 15 degrees C. above said eutectic melting temperature, and comprising an additive element selected from the group consisting of Fe and Co present in said alloy in an amount effective to form a thermal growth resistant intermetallic interface between the alloy and a soldered component as compared to an interface formed between the same alloy, devoid of said additive element, and said component.

4. A soldering process for a component comprising melting and solidifying a Pb-free solder consisting essentially of a eutectic composition consisting essentially of, in weight %, 93.6 weight % Sn, about 4.7 weight % Ag, about 1.7 weight % Cu having a eutectic melting temperature of about 217 degrees C. and including variant compositions from said eutectic composition wherein the concentrations of Sn, Ag, and Cu vary from said eutectic composition with said Ag not exceeding about 4.7 weight % and said Cu not exceeding about 1.7 weight % in said variant compositions to provide a Sn concentration of at least 93.6 weight % to provide a controlled melting temperature range not exceeding about 15 degrees C. above said eutectic melting temperature, and further comprising an additive element selected from the group consisting of Fe and Co in an effective amount in the solder to form a thermal growth resistant intermetallic interface between the solder and the component as compared to an interface formed between the same solder, devoid of said additive element, and said component.

5. The process of claim 4 wherein the molten solder is soldified in contact with a copper electrical component.

6. A lead-free solder consisting of, in weight %, about 3.5% to about 7.7% Ag, about 1.0% to about 4.0% Cu, an additive element selected from the group consisting of Fe and Co in an individual amount not exceeding about 0.5% or collective amount not exceeding about 1%, and balance Sn.

7. A lead-free solder consisting of, in weight %, about 3.0% to about 4.0% Ag, about 0.5% to about 4.0% Cu, an additive element selected from the group consisting of Fe and Co in an individual amount not exceeding about 0.5% or collective amount not exceeding about 1%, and balance Sn.

8. The solder of claim 7 wherein the ratio of Ag/(Cu+X) where X= at least one of Fe and Co is about 3 to 1.

9. In a soldering process for a component by melting and solidifying a Pb-free solder consisting of, in weight %, about 3.5% to about 7.7% Ag, about 1.0% to about 4.0% Cu, and balance Sn, the improvement comprising melting and solidifying said solder with an additive element therein selected from the group consisting of Fe and Co in an individual amount not exceeding about 0.5% by weight or collective amount not exceeding about 1% by weight.

10. The process of claim 9 wherein the ratio of Ag/(Cu+X) where X= at least one of Fe and Co is about 3 to 1.

11. In a soldering process for a component by melting and solidifying a Pb-free solder consisting of, in weight %, about 3.0% to about 4.0% Ag, about 0.5% to about 4.0% Cu, and balance Sn, the improvement comprising including melting and solidifying said solder with an additive element therein selected from the group consisting of Fe and Co in an individual amount not exceeding about 0.5% by weight or collective amount not exceeding about 1% by weight.

12. The process of claim 11 wherein the ratio of Ag/(Cu+X) where X= at least one of Fe and Co is about 3 to 1.

* * * * *